No. 724,336. PATENTED MAR. 31, 1903.
E. RUSSEL.
TELEPHONE ATTACHMENT FOR TELEGRAPH LINES.
APPLICATION FILED OCT. 26, 1901.
NO MODEL.
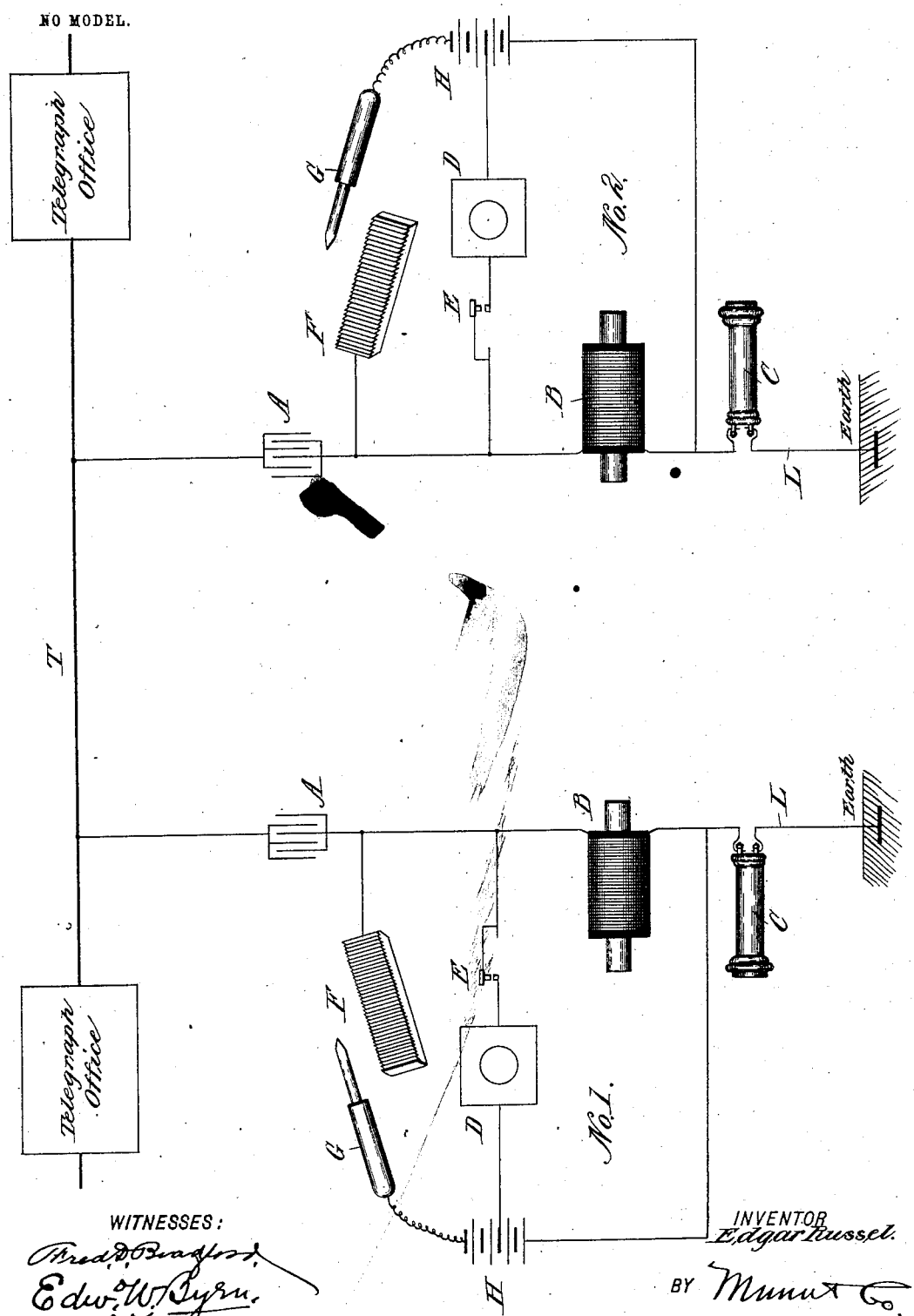
WITNESSES:
INVENTOR
Edgar Russel.
BY
ATTORNEYS

UNITED STATES PATENT OFFICE.

EDGAR RUSSEL, OF THE UNITED STATES ARMY.

TELEPHONE ATTACHMENT FOR TELEGRAPH-LINES.

SPECIFICATION forming part of Letters Patent No. 724,336, dated March 31, 1903.

Application filed October 26, 1901. Serial No. 80,139. (No model.)

*To all whom it may concern:*

Be it known that I, EDGAR RUSSEL, of the United States Army, stationed at Washington city, District of Columbia, have invented a new and useful Improvement in Telephone Attachments for Telegraph-Lines, of which the following is a specification.

The object of my invention is to provide a simple, practical, and portable form of telephonic apparatus capable of being quickly adjusted to a telegraph-line at any point or points along the same, so as to utilize such line for telephonic purposes without impairing its value for telegraphic purposes and without any interference to the telephonic communications from the transmission of ordinary telegraphic messages. In military operation in the field and in many other instances such a device is a great desideratum and finds very useful applications, and my invention fills such want in a simple and practical way.

It consists in the particular arrangement of an inductance-coil, a transmitter, a receiver, a local battery, a circuit-interrupter, and a condenser, as will be hereinafter fully described with reference to the drawing, in which the figure is a diagram of the essential elements with their circuits in proper relation to a telegraph-line for both a sending and receiving station.

Referring to the drawing, T represents a telegraph-line connecting more or less remote telegraph-offices, to which line two sets of my telephonic apparatus are shown applied at any points along the line. The two sets of the apparatus shown at No. 1 and No. 2 are exact duplicates of each other, each comprising a calling, a sending, and a receiving device.

A is a condenser, one set of the plates of which are connected to the telegraph-line T and the other set to earth by wire L, the insulation between the plates of the condenser preventing any direct contact between the telegraph-line and the earth, and hence permitting the ordinary telegraphic impulses to pass over the line in the usual way without grounding at the temporary telephone-stations.

B is an inductance-coil whose single coil is placed in circuit between the condenser and the earth.

C is a telephone-receiver; D, the transmitter; E, a push-button; F, a roughened or file-cut plate; G, a metal-pointed stylus, and H a local battery. The local battery has two circuits, one of which incloses a part of the cells of the battery, the transmitter, and the inductance-coil for the proper operation of the transmitter and the other of which incloses the full strength of the battery, the inductance-coil B, and the circuit-interrupter F G, which constitutes the calling device. Both these circuits connect with the wire L at points between the condenser A and the receiver C, which latter is placed next to the earth.

Now when station No. 1 wishes to call station No. 2 the operator at No. 1 drags the stylus G across the roughened plate F, and the full strength of the battery-circuit is rapidly made and broken through the inductance-coil B, which has somewhat the function of an autotransformer, and its self-induced discharges furnish the sudden variations in potential, which acting through condenser A, the telegraph-line T, and condenser A at station No. 2 produces on the diaphragm of the receiver C at station No. 2 audible vibrations that make the call. Having attracted the attention of operator at No. 2, the operator at No. 1 then separates the points F and G of the calling-circuit and closing the push-button E establishes the weaker talking-circuit through the transmitter D and inductance-coil. The talking vibrations in the transmitter now acting through the inductance-coil B and condensers A A and telegraph-line T are audible on the receiver C at station No. 2. The current fluctuations produced by the transmitter cause in a manner analogous to the calling effect high-potential variations in the condensers at the home and distant stations and effect the reproduction of audible speech in the distant receiver. The current impulses generated in calling are of such a brief character that they do not affect the relays of the telegraph-line in their ordinary adjustments.

In constructing the various elements of my apparatus for the best efficiency I make the inductance-coil about four inches long, two inches in diameter, wound with No. 22 or 23 Brown & Sharpe insulated copper wire to a resistance of four or five ohms. The core is about five-eighths of an inch in diameter, built of soft-iron wires and projecting about two or three inches from each end of the coil. The coil thus constructed though of low resistance offers considerable impedance to fluctuating currents of telephonic frequencies, and by reason of this the impulses of the transmitter are not short-circuited, but pass to the earth and to the line. The transmitter should be of rather low resistance, and the receiver should be preferably an instrument of about thirty ohms resistance. The condenser for ordinary distances of fifty to seventy-five miles is about one microfarad capacity. The battery for distances stated should be about two cells of the ordinary dry type for the transmitter and four for the calling-circuit. Preferably I employ a single battery coupled up for the two circuits, as shown; but it is obvious that two separate batteries may be employed.

For the circuit-breaker for calling the stylus and roughened plate are shown as a simple and practical device for this purpose; but it is obvious that any other rapid circuit-breaker, such as a toothed wheel, may be equally well employed.

Having thus described my invention, what I claim as new, and desire to secure by Letters Patent, is—

1. A telephonic apparatus, comprising a condenser, an inductance-coil, a transmitter, a receiver, and two local circuits, one inclosing the inductance-coil and the transmitter, and the other inclosing the same inductance-coil and also a calling device substantially as described.

2. A telephonic apparatus, comprising a condenser, an inductance-coil, a transmitter, a receiver, and a single local battery having a portion of its cells coupled up in a circuit inclosing the inductance-coil and the transmitter, and having the larger portion of its cells coupled up in a circuit inclosing both the inductance-coil and a calling device substantially as shown and described.

3. In a telephonic apparatus, the combination with a transmitter, a battery, and a calling device substantially as described; of an inductance-coil for producing reactionary effects in the nature of interrupted and undulatory currents of high electromotive force, said same inductance-coil being introduced into and utilized for both the calling and talking circuits as described.

4. A telephonic apparatus combined with a telegraphic line, said telephonic apparatus comprising a condenser having one set of its plates connected to said line and the other set to earth, an inductance-coil placed between said condenser and the earth, and a local-battery circuit inclosing said inductance-coil, and means for oscillating said local-battery circuit through said inductance-coil substantially as and for the purpose described.

5. A telephonic apparatus combined with a telegraphic line, said telephonic apparatus comprising a condenser having one set of its plates connected to said line, and the other set to earth, an inductance-coil placed between said condenser and the earth, and two circuits one inclosing a transmitter and the inductance-coil, and the other inclosing a calling device and the said inductance-coil substantially as described.

6. A telephonic apparatus combined with a telegraphic line, said telephonic apparatus comprising a condenser having one set of its plates connected to said line and the other set to the earth, an inductance-coil placed between said condenser and the earth, and a local battery having a portion of its coils coupled through the inductance-coil and inclosing a transmitter, and the greater number of its cells coupled through the inductance-coil and inclosing in its circuit a calling device substantially as described.

7. A telephonic apparatus combined with a telegraphic line, said telephonic apparatus comprising a condenser having one set of its plates connected to said line, and the other set to earth, an inductance-coil placed between said condenser and the earth, a receiver placed between the inductance-coil and the earth, and two local circuits, one inclosing the inductance-coil and a transmitter, and the other inclosing the inductance-coil and a calling device substantially as described.

EDGAR RUSSEL.

Witnesses:
EDW. W. BYRN,
SOLON C. KEMON.